United States Patent [19]

Choung et al.

[11] Patent Number: 4,566,012

[45] Date of Patent: Jan. 21, 1986

[54] WIDE-BAND MICROWAVE SIGNAL COUPLER

[75] Inventors: Younho Choung; Kenneth R. Goudey, both of Sunnyvale, Calif.

[73] Assignee: Ford Aerospace & Communications Corporation, Detroit, Mich.

[21] Appl. No.: 454,896

[22] Filed: Dec. 30, 1982

[51] Int. Cl.[4] .......................... H01P 5/18; H04B 7/10

[52] U.S. Cl. .................................... 343/359; 343/422; 343/7.4; 333/113; 333/21 R; 333/109; 333/137; 333/21 A

[58] Field of Search ................... 333/21 R, 21 A, 113, 333/109, 111, 137, 136, 135, 126, 117; 343/371, 359, 373, 7.4, 420, 422, 427

[56] References Cited

U.S. PATENT DOCUMENTS

| | | | |
|---|---|---|---|
| 2,748,350 | 5/1956 | Miller | 333/21 R X |
| 2,820,203 | 1/1958 | Sferrazza | 333/113 |
| 2,871,452 | 1/1959 | Hewlett | 333/113 |
| 2,963,663 | 12/1960 | Marcatili | 333/21 R |
| 3,353,183 | 11/1967 | Giger | 343/7.4 |
| 3,369,197 | 2/1968 | Giger et al. | 333/21 R |
| 3,566,309 | 2/1971 | Ajioka | 333/21 R X |
| 3,569,870 | 3/1971 | Foldes | 333/21 R |
| 3,646,481 | 2/1972 | Den | 333/21 R |
| 3,731,235 | 5/1973 | Ditullio et al. | 343/777 X |
| 3,918,010 | 11/1975 | Marchalot | 333/21 R X |
| 3,922,621 | 11/1975 | Gruner | 333/21 R X |
| 4,246,583 | 1/1981 | Profera et al. | 343/781 CA |
| 4,367,446 | 1/1983 | Hall | 333/21 R X |

FOREIGN PATENT DOCUMENTS 0124302 9/1980 Japan .

OTHER PUBLICATIONS

Proceedings of the Symposium on Modern Advances in Microwave Techniques, New York, N.Y., Nov. 8-10, pp. 330-331.

Miller, "Coupled Wave Theory and Waveguide Applications." *The Bell System Technical Journal*, May 1954, pp. 661-719.

Miller, "On Solutions for Two Waves with Periodic Coupling," *The Bell System Technical Journal*, Oct. 1968, pp. 1801-1822.

Y. Choung et al., "Ku-Band Tracking Feed for Earth Terminal Operation," 1982 *APS Symposium Digest*, May 24-28, 1982, pp. 632-635.

*Primary Examiner*—Eugene R. LaRoche
*Assistant Examiner*—Benny T. Lee
*Attorney, Agent, or Firm*—Edward J. Radlo; Kenneth R. Allen; Robert D. Sanborn

[57] ABSTRACT

A microwave coupler for coupling microwave energy from a first waveguide to a second waveguide disposed side by side along a propagation length includes a common coupling means, and specifically, orifices along the propagation length wherein the coupling orifices are sized to promote coupling of a favored field mode of electromagnetic energy according to a Bessel function distribution of energy along the length of the waveguide. The Bessel function distribution provides for wideband, low-loss coupling of the favored field mode and maximal isolation from non-favored field modes. The invention is particularly useful for extracting a type $TE_{21}$ circular mode signal from a signal containing $TE_{11}$ and $TE_{21}$ circular modes wherein the $TE_{21}$ mode signals are used for generating elevational and azimuthal tracking signals.

6 Claims, 15 Drawing Figures

WIDE-BAND MICROWAVE SIGNAL COUPLER

BACKGROUND OF THE INVENTION

1. Field of the Invention

This invention relates to a coupler for microwave energy. In particular, the invention concerns means for coupling a selected mode from one microwave waveguide to another waveguide. A particular application of this invention is in the guidance mechanism of an auto-tracking satellite antenna system in which higher order waveguide modes are used to develop elevational and azimuthal information respecting the position of the boresight axis of the antenna relative to the signal source.

When an incident wave is received by an antenna, the output level of the communications signal is maximum when the antenna points directly toward a point signal source. On the other hand, higher order modes are excited in the waveguide when the boresight axis of the antenna feed is not in line with the point source. For example, the dominant mode in a circular waveguide is the $TE_{11}$ mode. The higher order mode $TE_{21}$ and $TE_{21}$* are orthogonal modes which may be used to generate error signals for use in a servo system or for tracking a beam. In addition, the $TE_{01}$ mode and the $TM_{01}$ mode as well as conjugate modes may be used with the dominant $TE_{11}$ mode for this purpose.

Mode couplers which generate higher order modes can be classified into three categories. In the first category, herein designated the traveling wave coupler, a series of apertures are provided along the length of a common wall of juxtaposed waveguides. A mode is generated by using a coupled wave mechanism in which the E-vectors add as a wave passes successive holes. In a second category, herein designated as a geometric coupler, modes are generated using a particular geometrical shape for a single aperture or set of apertures. In the third category designated a resonant coupler, modes are generated by the development of standing waves in a resonant cavity which is tuned to the resonant frequency of the mode. A resonant coupler can only be used for narrow-band frequency operation.

The present invention is of the type known as a traveling wave coupler.

2. Description of the Prior Art

U.S. Pat. No. 3,918,010 to Marchalot describes an optimized rectangular-to-circular wave-guide coupler of the traveling wave type. In the Marchalot patent, a metallic tongue is disposed within a circular waveguide opposing a line of equally spaced holes of equal diameter. The metallic tongue is formed in a manner to attenuate propagation modes other than $TE_{01}$ or $TE_{02}$. Isolation of about 20 dB is claimed.

A number of geometric couplers are known. For example, U.S. Pat. No. 3,566,309 to Ajioka and U.S. Pat. No. 4,246,583 to Profera et al.

A number of resonant couplers are also known. For example, U.S. Pat. No. 3,369,197 to Giger et al., U.S. Pat. No. 3,646,481 to Den and U.S. Pat. No. 2,963,663 to Marcatili.

Not to be confused with mode couplers which generate higher order modes are mode couplers which generate a dominant mode. Such devices are disclosed in U.S. Pat. No. 3,922,621 to Gruner and U.S. Pat. No. 3,731,235 to Ditullio et al.

A further patent of interest is U.S. Pat. No. 3,569,870 to Foldes. This patent describes a feed system, but it does not employ mode coupling.

Without prejudice, reference is made to articles by Y. H. Choung, K. R. Goudey, and L. G. Bryans, entitled "Theory and Design of Ku-band $TE_{21}$-mode Coupler", IEEE *Transactions on Microwave Theory and Techniques,* November 1982; and Y. Choung, K. Kilburg, and T. Smith, "Ku-band Tracking Feed for Earth Terminal Operation", 1982 *APS Symposium Digest, Antennas and Propagation,* Vol. II, May 24–28, 1982 (IEEE Antennas and Propagation Society) 82CH17383-0. These articles describe elements of the present invention.

SUMMARY OF THE INVENTION

According to the invention an apparatus for coupling microwave electromagnetic energy from the first waveguide to a second parallel waveguide through coupling orifices which promotes coupling of a favorite field mode of electromagnetic energy with maximal inter-mode isolation comprises means for transferring the favored field mode of electromagnetic energy from the first waveguide to the second waveguide according to a Bessel function distribution along the length of the waveguides. Specifically, an energy distribution function along the length of the waveguide which is a pedestal-weighted Bessel function of the first kind of order zero provides optimal wide-band energy coupling the favored field mode from the driven element to the undriven element with excellent isolation of all other field modes and particularly of the dominate field mode in the driven element or first waveguide.

In specific embodiments of the invention, the first waveguide is a circular waveguide, and the second waveguide is a rectangular waveguide wherein orifices are provided between the first waveguide and the second waveguide in the form of circular holes of a diameter no greater than 0.3 wavelengths of the lowest order mode of the highest frequency of signal intended to traverse the length of the first waveguide.

In further embodiments of the invention multiple arms in the form of rectangular waveguides are juxtaposed to the circular waveguide around the central or boresight axis. The arms may be grouped in pairs and disposed at a specified angular separation relative to the boresight axis and coupled together through hybrid structures to develop balanced, full-phase signals of a desired high order mode. In the case of $TE_{21}$ and $TE_{21}$* orthogonal modes, signals of both modes may be extracted simultaneously through separate waveguide arms disposed at a separation of 45° from one another relative to the boresight axis.

It is an object of the invention to provide a coupler for use in coupling selected modes of microwave electromagnetic energy from one waveguide to another waveguide with maximum bandwidth band minimum phase distortion.

It is a further object of the invention to provide a wide-band waveguide coupler to be used in a satellite tracking system wherein modes higher than a fundamental mode induced within a receiving waveguide may be employed to develop error signals for steering a directional antenna.

It is a further object of the invention to provide a waveguide coupler with wide-band selective mode coupling capabilities wherein excellent isolation is maintained between a fundamental mode traversing a main waveguide and higher order modes developed in the main waveguide and intended to be coupled to waveguides juxtaposed to the main waveguide.

It is a further object of the invention to provide a coupler for developing microwave signal tracking information wherein the $TE_{11}$ mode is employed as a reference signal and the $TE_{21}$ and $TE_{21}$* higher order modes are employees as different signals for generating orthogonal error signals with respect to the reference signal.

The invention will be better understood by reference to the following detailed description taken in conjunction with the accompanying drawing.

DESCRIPTION OF SPECIFIC EMBODIMENTS

In order to understand the principles of the invention, it is helpful to have some background in microwave coupling theory. Reference is made to the following works: S. E. Miller, "Coupled Wave Theory and Waveguide Applications", *The Bell System Technical Journal,* pp, 661–719 (May 1954); S. E. Miller, "On Solutions for Two Waves with Periodic Coupling", *The Bell System Technical Journal,* pp. 1801–1822 (October 1968); and the articles by Choung et al., herein above cited. These works describe theories underlying the present invention and are incorporated herein by reference and made a part hereof.

Figure 2:
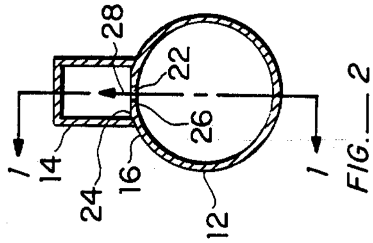
FIG. 2 is a cross-sectional view across the boresight axis of the coupler of FIG. 1.
Figure 1:
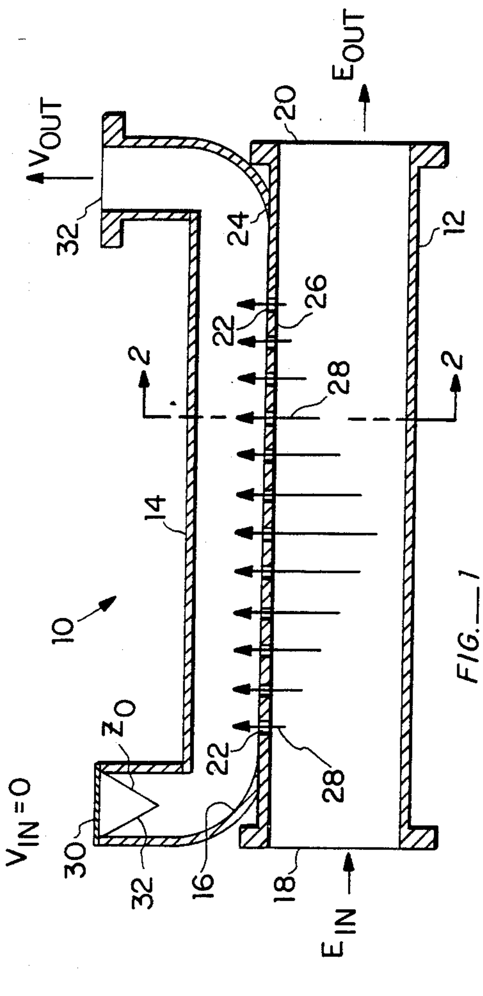
FIG. 1 is a side cross-sectional view of a one arm coupler according to the invention.

Referring to FIG. 1 and FIG. 2, there are shown cross-sectional views of one-arm traveling wave type mode coupler 10 according to the invention. It is desired to couple the $TE_{21}$-mode of a circular waveguide to a juxtaposed rectangular waveguide with positive directivity, at least 40 dB isolation between waveguides for all other modes over a wide bandwidth with minimal coupling loss and low VSWR. A bandwidth of 25% to 40% is desirable.

The mode coupler 10 comprises a circular first waveguide 12 and a rectangular second waveguide 14 juxtaposed to the circular outer wall 16 of first waveguide 12.

The mode coupler 10 may be characterized as having a propagation region extending a length between an input port 18 and an output port 20. Energy coupling according to the invention takes place within this propagation length.

According to the invention, microwave electromagnetic energy of a preselected mode is coupled between the first waveguide 12 and the second waveguide 14 in a pattern along the propagation length conforming to a Bessel function distribution of energy. In a specific embodiment, orifices 22 are provided in the common wall formed by the outer wall 16 of the first waveguide 12 and a margin wall 24 of the second waveguide 14. The common portion of the outer wall 16 and margin wall 24 is hereinafter designated the coupling region 26. The coupling region 26 may comprise any medium whereby energy transfer from the first waveguide 12 to the second waveguide 14 may be regulated. For example, the coupling region may be formed of a dielectric of defined physical and electrical characteristics spatially arranged to provide energy transfer according to the predefined distribution pattern.

In the specific embodiment shown in FIG. 1, the approximate relative amplitude of distribution of energy is indicated by the relative lengths of vectors 28. For example, a maximum energy transfer occurs through orifices 22 centered between the input port 18 and the output port 20 whereas minimum energy transfer occurs through orifices 22 closest to input port 18 and the output port 20. To promote the coupling of only the favored field mode according to the invention, the orifices 22 are disposed in generally a straight line along the propagation length. The orifices 22 may be circular, although there is no inherent limitation to the use of circular orifices. Orifices preferably have a maximum dimension no greater than 0.3 wavelengths of the lowest order mode of the highest frequency of the signal intended to transverse through the first waveguide, namely the fundamental signal. The maximum size of the orifices is a function of the risk of intrahole resonance with respect to the signals transversing the waveguide.

There is no inherent limitation to the use of the combination of a circular waveguide and a rectangular waveguide, although use of the circular waveguide in combination with the rectangular waveguide is particularly useful for applications wherein directional signals are extracted from a free-space microwave signal introduced along the boresight axis or central axis of the circular waveguide.

The mode coupler 10 according to the invention is constructed as a four part device which in addition to the input port 18 and the output 20 is provided with an auxiliary input port 30 and an auxiliary output port 32 for use in developing the auxiliary signal extracted from the first waveguide 12 by the second waveguide 14. The auxiliary port is preferably a terminal with an impedance matching apparatus having a characteristic impedance $Z_0$ matched to the characteristic impedance of the second waveguide 14. The other ports 18, 20 and 32 are provided with means for mechanically matching to appropriate transmission conduits of the characteristic impedance.

Figure 3A:
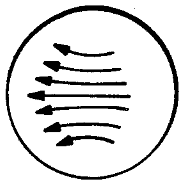
FIG. 3A is a mode diagram of a $TE_{11}$ mode in a circular waveguide.
Figure 3B:
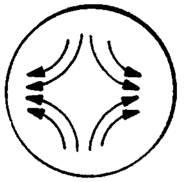
FIG. 3B is a mode diagram of a $TE_{21}$ mode in a circular waveguide.
Figure 3C:
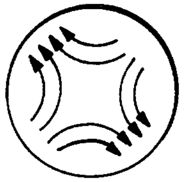
FIG. 3C is a mode diagram of a $TE_{21}$* mode in a circular waveguide.

Referring to FIGS. 3A, 3B and 3C, there are shown three types of modes commonly developed in a circular waveguide. FIG. 3A illustrates the $TE_{11}$ mode signal. FIG. 3B illustrates the $TE_{21}$ mode signal. FIG. 3C represents the conjugate of the $TE_{21}$ mode signal of FIG. 3B, generally designated $TE_{21}$*. The modes of FIGS. 3A, 3B, and 3C may coexist within a waveguide. Modes $TE_{21}$ and $TE_{21}$* are conjugates of one another and are considered to be orthogonal and therefore can be detected separately.

Figure 4:
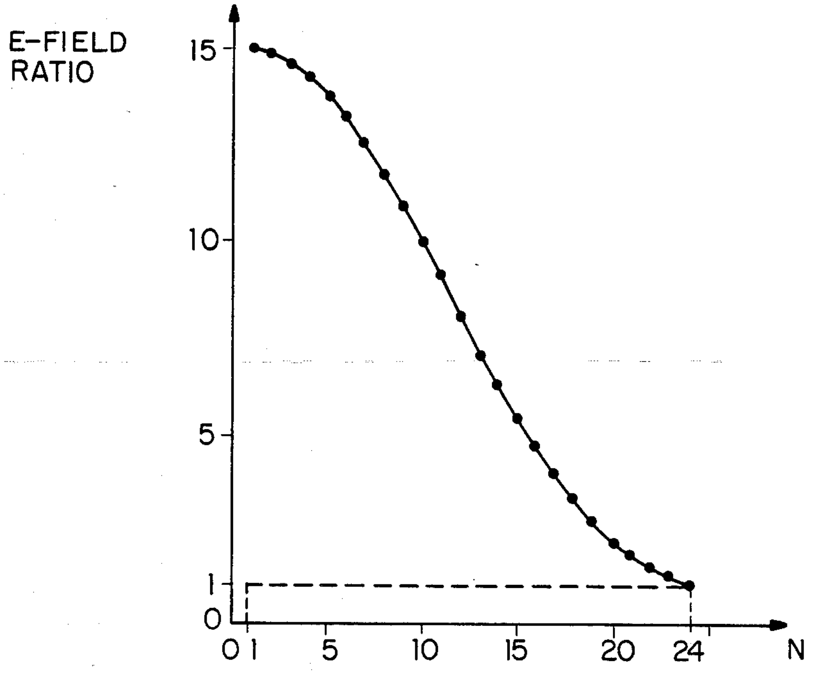
FIG. 4 is a diagram of Bessel function distribution with respect to one-half of the coupler length according to the invention.

FIG. 4 illustrates the coupling distribution function of a preferred embodiment of the invention illustrating the E-field ratio as a function of the distance of the number of holes along the length of a coupling region 26 between a first waveguide 12 and a second waveguide 14 according to the invention. it was found that a Bessel function distribution on a pedestal provided the best isolation of unwanted modes in a minimum coupler length.

TABLE 1

| N | X | $J_o(X)$ | $J_o(X)$ + .4017 | Add 0.1 Pedestal | E-field Ratio | Hole Diameter Ratio |
|---|---|---|---|---|---|---|
| 1 | .08 | .9984 | 1.4001 | 1.5001 | 15.001 | 2.1218 |
| 2 | .24 | .9856 | 1.3873 | 1.4873 | 14.873 | 2.1167 |
| 3 | .40 | .9604 | 1.3621 | 1.4621 | 14.621 | 2.1067 |
| 4 | .56 | .9231 | 1.3248 | 1.4248 | 14.248 | 2.0916 |
| 5 | .72 | .8745 | 1.2762 | 1.3762 | 13.762 | 2.0716 |
| 6 | .88 | .8156 | 1.2173 | 1.3173 | 13.173 | 2.0466 |
| 7 | 1.04 | .7473 | 1.1490 | 1.2490 | 12.490 | 2.0165 |
| 8 | 1.20 | .6711 | 1.0728 | 1.1728 | 11.728 | 1.9816 |
| 9 | 1.36 | .5884 | .9901 | 1.0901 | 10.901 | 1.9417 |
| 10 | 1.52 | .5006 | .9023 | 1.0023 | 10.023 | 1.8969 |
| 11 | 1.68 | .4095 | .8112 | .9112 | 9.112 | 1.8474 |
| 12 | 1.84 | .3167 | .7184 | .8184 | 8.184 | 1.7931 |
| 13 | 2.00 | .2239 | .6256 | .7256 | 7.256 | 1.7341 |
| 14 | 2.16 | .1327 | .5344 | .6344 | 6.344 | 1.6706 |
| 15 | 2.32 | .0448 | .4465 | .5465 | 5.465 | 1.6028 |
| 16 | 2.48 | −.0384 | .3633 | .4633 | 4.633 | 1.5310 |
| 17 | 2.64 | −.1154 | .2863 | .3863 | 3.863 | 1.4556 |
| 18 | 2.80 | −.1850 | .2167 | .3167 | 3.167 | 1.3774 |
| 19 | 2.96 | −.2462 | .1555 | .2555 | 2.555 | 1.2977 |
| 20 | 3.12 | −.2980 | .1037 | .2037 | 2.037 | 1.2185 |
| 21 | 3.28 | −.3398 | .0619 | .1619 | 1.619 | 1.1432 |
| 22 | 3.44 | −.3711 | .0306 | .1306 | 1.306 | 1.0770 |
| 23 | 3.60 | −.3918 | .0099 | .1099 | 1.099 | 1.0266 |
| 24 | 3.76 | −.4017 | 0 | .1000 | 1.0 | 1.0 |

Table 1 illustrates the procedure used to obtain the optimum Bessel distribution with pedestal over a length containing 24 pairs of equally spaced coupling points disposed symmetrically in rows along the circular waveguide about its boresight axis. To maintain the same phase constant in each of the waveguides, the same cutoff frequencies were chosen for each waveguide. To this end, the ratio of the interior broadwall dimension of the rectangular waveguide, namely the second waveguide 14, to the inside diameter of the circular waveguide, namely the first waveguide 12, was 1 to 0.51425. In a waveguide having a cutoff frequency of the $TE_{21}$ mode at 10.59385 GHz, the interior broadwall dimension is 0.57 inches and the inside diameter is 1.083 inches. The strength of the coupling for each hole is a strong function of wall thickness. In the specific design described, a constant dimension of the 0.030 inches were chosen as the thickness of the common margin wall 24. Therefore, the only variable in the preferred design was the diameter of the circular orifices 22.

Referring to Table 1, the procedure for obtaining the desired Bessel function distribution in order to develop the preferred E-field ratio over the coupling range of interest is as follows: The Bessel function distribution of the first kind of the zeroeth order is tabulated in equally spaced increments over the number of desired orifices between the maximum value and the minimum value. In the case of 24 pairs of holes, the maximum occurs at the hole most closely corresponding to the independent variable in the Bessel function $X=0$, which is the location between the two largest holes $N=1$ (FIG. 4 and its reflection about the Y axis). The minimum occurs at the hole most closely corresponding to the independent variable in the Bessel function $X=3.84$, which is the location of hole $N=24$ (FIG. 4 and its reflection about the Y axis). A value equal to the difference between 0 and the negative value of the Bessel function at the minimum point is added to each value of the Bessel function so that the minimum value of the Bessel function occurs at zero. In addition, a small pedestal value is added to each Bessel function value, and specifically a value equal to 0.1 at the minimum point so that the Bessel function value at each point is a positive non-zero value. It will be seen that the Bessel function value therefore correspond to a set of E-field ratios over a distance along the waveguide having a range of 15 to 1, the pedestal being the reference amplitude of 1.0.

The hole diameter ratio is then determined, the hole diameter of the last orifice in the series serving as the reference diameter. Coupling is approximately expressed as a function of the diameter of the uniformly round orifice raised to between the 3rd and 4th power. An empirical expression for coupling has been obtained and is set forth in the discussion in respect to FIGS. 8 through 13 hereinbelow. Included in the discussion below in connection with equation 18 is a description of the computation of the hole diameter ratio, that is, the ratio of the diameter of each hole to the smallest hole.

Figure 5:
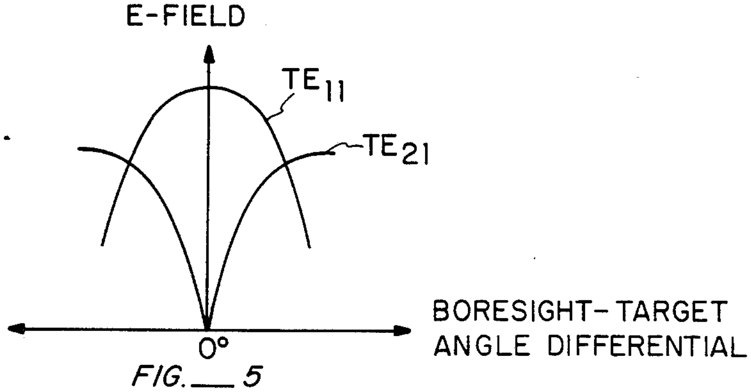
FIG. 5 is an amplitude diagram of the E-field strength of the $TE_{11}$ and $TE_{21}$ modes in a circular waveguide as a function of difference in any angle between the boresight axis and the normal axis of an incident plane wave.

FIG. 5 illustrates the characteristic of the E-fields within a circular waveguide as a function of the angle between the boresight of the waveguide and the axis of the incident wavefront or so-called target. Where the boresight and target angle differential is zero, the dominant $TE_{11}$ mode is at a maximum and the higher order $TE_{21}$ mode is at a null. As an angle differential develops between the boresight axis and the target axis, the amplitude of the E-field of the $TE_{21}$ mode increases sharply on either side of the null and the amplitude of the $TE_{11}$ mode is attenuated. This characteristic can be used effectively for developing servo steering control mechanisms wherein the higher order modes are used to develop error signals in a servo control system.

Figure 6:
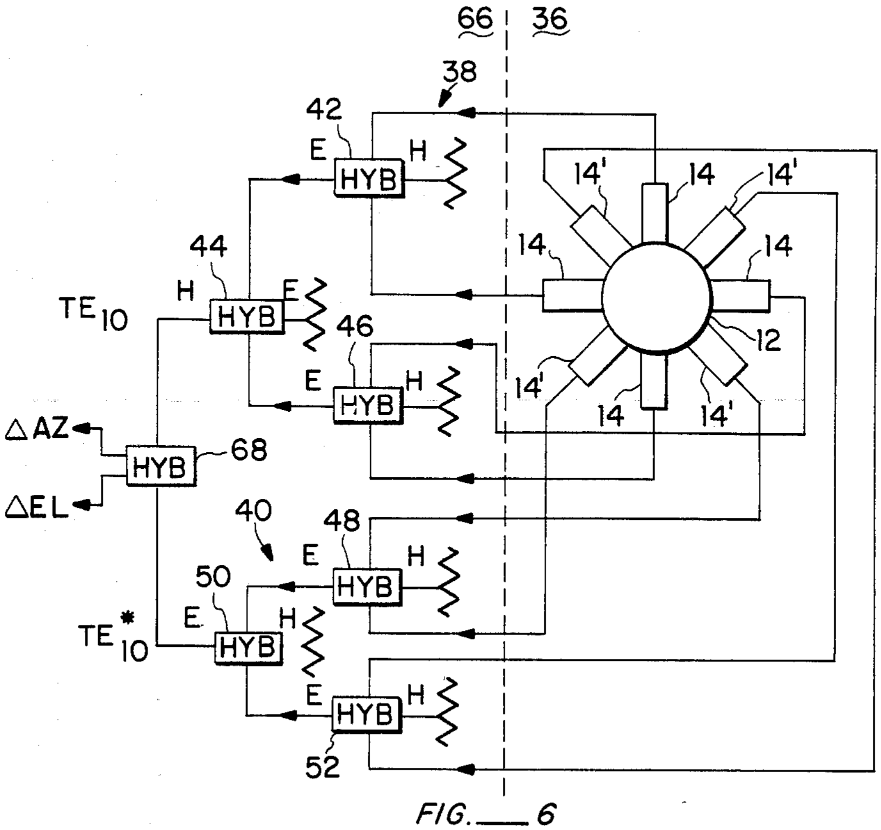
FIG. 6 is a schematic diagram of a dual four-arm coupler according to the invention.

FIG. 6 illustrates a dual four-arm mode coupler 36 and a comparator network 66 according to the invention in which a first waveguide 12 supports both the $TE_{21}$ and $TE_{21}$* modes. The device 66 comprises first four-arm coupler network 38 and second four-arm coupler network 40 each having four rectangular second waveguides 14 and 14' disposed around the circular waveguide 12. Second waveguides 14 are disposed at angles of 90° to one another about the boresight axis. Similarly, second waveguides 14' are disposed at 90° to one another around the boresight axis and at 45° displacement from the second waveguides 14. Each four-arm coupler provides a balanced, phase-matched full wave coupling structure for detecting the circular $TE_{21}$ mode. Since the second couplers 14 and 14' are disposed at a 45° angle to one another, signals developed at each port represent orthogonal values. The rectangular second waveguide supports a rectangular $TE_{10}$ mode. The signals in the waveguides can be combined through two pairs of networks 38 and 40 each comprising three 180 degree-type hybrid devices (42, 44, 46), and (48, 50, 52). Each input leg of the hybrid devices 42 and 44 as well as each input leg of hybrid devices 48 and 52 receive ¼ of the total power extracted from the rectangular waveguides 14 corresponding to the detected mode. Hybrid devices 44 and 50 are provided with inputs which combine to provide 100% of the available power out of the respective four-arm rectangular waveguide sets. The outputs of the networks 38 and 40 may be directed through a phase separating hybrid 68 which permits extraction of orthogonal elevational and azimuthal signals through dual output ports. The phase separating hybrid 68 is a 90 degree-type when the system input signal has circular polarization, and is a 180 degree-type when the system input signal has linear polarization. Measured coupling has shown that essentially all power of the $TE_{21}$ and $TE_{21}$* can be successfully extracted, subject only to dissipation losses. Mode rejection of about 42 dB has been achieved over a frequency range of 10.95 to 14.5 GHz with minimal losses to the dominant mode attributable to VSWR in a bandwidth between 10.95 and 20 GHz.

Figure 7:
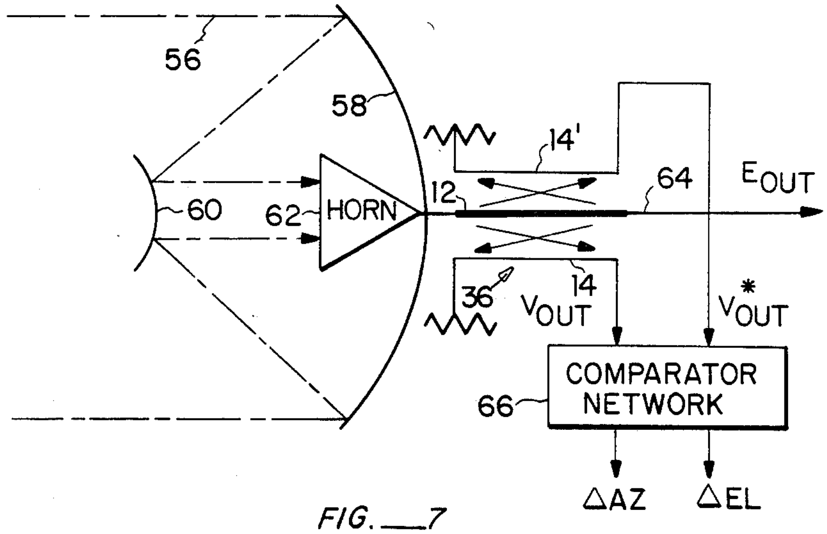
FIG. 7 is a schematic diagram of an antenna system with target tracking capabilities employing a mode coupler according to the invention.
Figure 8:
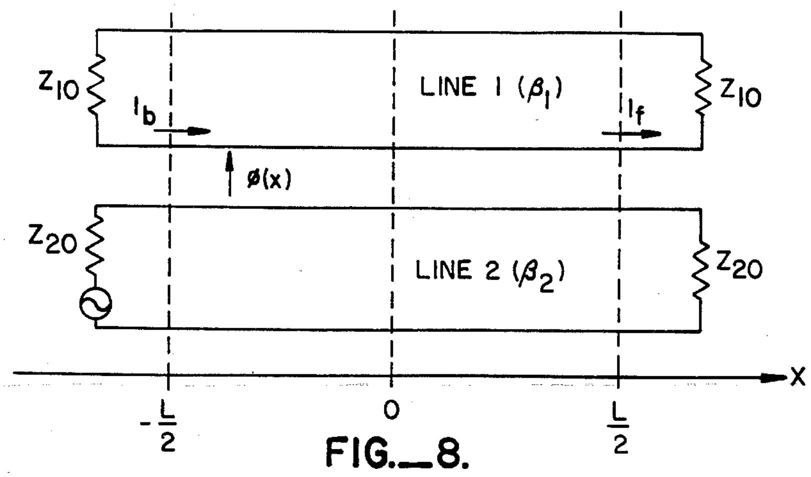
FIG. 8 is a circuit diagram of coupled transmission lines.
Figure 9:
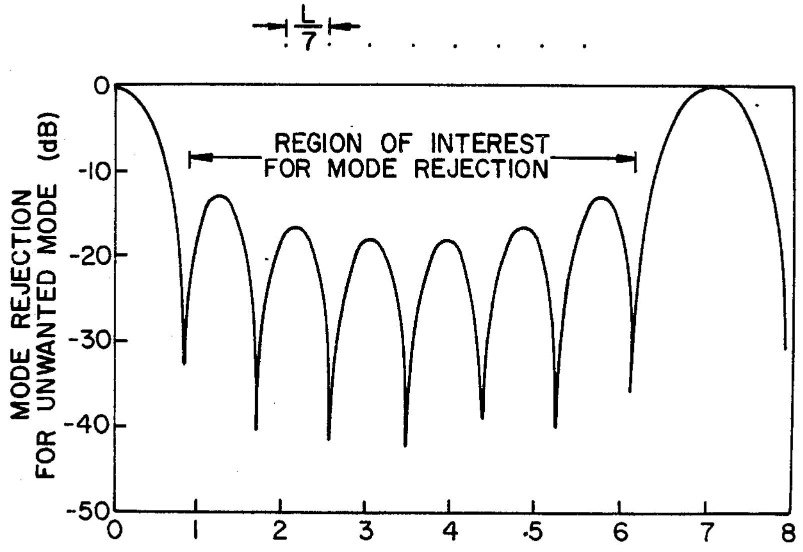
FIG. 9 is a diagram illustrating directivity of eight equal-strength, equally spaced coupling points.

FIG. 7 illustrates an application of the invention wherein a far-field microwave signal 56 such as from a satellite is focused by a reflector network 58, 60 to a microwave receiving horn 62 coupled to a dual four-arm coupler 36 according to the invention. The circular waveguide 12 conveys the $TE_{11}$ mode signal to a signal output 64. The signal output 64 conveys the signal to be demodulated for recovery of intelligence. The circular waveguide 12 also supports the $TE_{21}$ and $TE_{21}$* modes which are coupled by the mode coupler 36 to rectangular waveguides 14 and 14' which in turn are directed through a comparator network 66 from which signals representing change in azimuthal and change in elevational values may be developed for use in a servo steering system of the antenna including the reflectors 58 and 60.

Theoretical design of the $TE_{21}$ coupler was done by using "loose" and "tight" coupled-mode theory. Loose coupling theory shows how to taper coupling to minimize the length of the coupling region, while tight coupling theory defines the periodic exchange of energy between coupled waves. The design procedure calls for first finding the desired coupling taper distribution $\phi(x)$ for minimization of coupling to undesired modes by neglecting the transferred power between the coupled waves, and secondly considering the power transferred to the desired $TE_{21}$ mode.

Loose Coupling Theory

Figure 11:
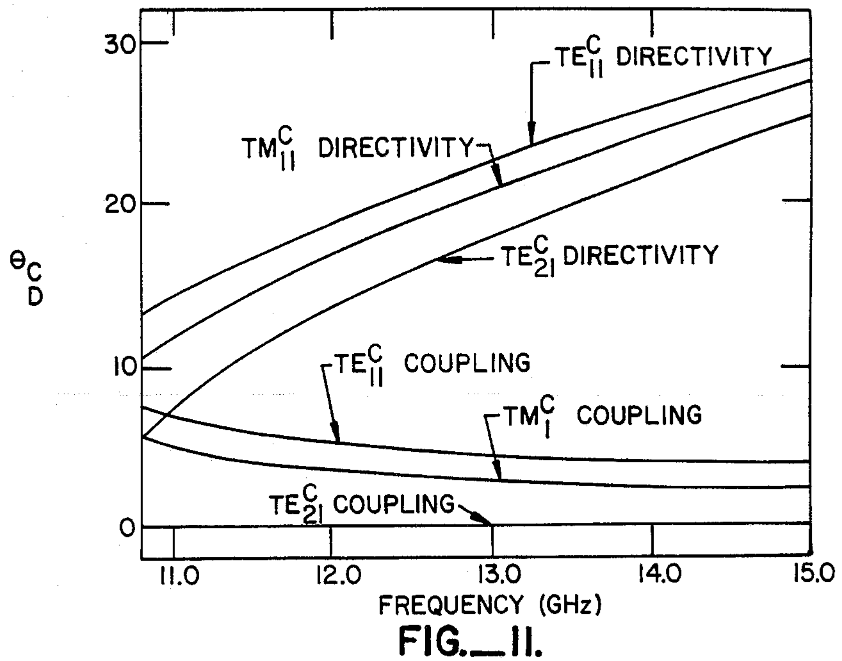
FIG. 11 is a diagram of frequency versus coupling and directivity parameters for various modes of electromagnetic propagation.

A general circuit diagram of coupled transmission lines is shown in FIG. 11. Coupling between the lines may be defined as the ratio of the forward current for $\beta_1 \neq \beta_2$ to the forward current for $\beta_1 = \beta_2$. Directivity may be defined as the ratio of the backward current for $\beta_1 \neq \beta_2$ to the forward current for $\beta_1 = \beta_2$ $$\text{Coupling} = \left| \frac{I_f(\beta_1 \neq \beta_2)}{I_f(\beta_1 = \beta_2)} \right| = \frac{\int_{-L/2}^{L/2} \phi(x) e^{-j(2\pi/L)\theta X} dx}{\int_{-L/2}^{L/2} \phi(x) dx} \quad (1)$$

$$\text{Directivity} = \left| \frac{I_b(\beta_1 \neq \beta_2)}{I_f(\beta_1 = \beta_2)} \right| = \frac{\int_{-L/2}^{L/2} \phi(x) e^{-j(2\pi/L)\theta D} dx}{\int_{-L/2}^{L/2} \phi(x) dx}$$

where $$\theta_{CD} = \frac{L}{2\pi} (\beta_1 \mp \beta_2), \quad (2)$$

$\theta_C$ = coupling parameter. $\theta_D$ = directivity parameter

- $\beta_1$ phase constant of line 1 for the particular mode considered,
- $\beta_2$ phase constant of line 2 for the particular mode considered,
- L length of the coupling section.
- $\phi(x)$ coupling function. More precisely. $1/\phi(x)$ is the ratio of the voltage on line 2 to the voltage on line 1 at x.

For the $TE_{21}$-mode coupler, line 1 is a circular waveguide and line 2 is a rectangular waveguide $\phi(x)$ results from a coupling structure on the common wall between the two waveguides composed of an array of coupling holes. Each coupling hole may be considered a discrete coupling point. Let $\phi_i(X)$ be a known coupling function for the ith coupling point and $F_i$ be the finite Fourier transform of $\phi_i(X)$ $$F_i(\theta) = \int_{-L/2}^{L/2} \phi_i(X) e^{-j(2\pi/L)\theta X} dX. \quad (3)$$

Consider the case of tapered amplitudes and an even number (2N) of equally spaced couplings. Let $\alpha_i$ be the coupling strengths and s be the spacing between coupling points. Then $\phi(X)$ is expressed as $$\phi_i(x) = \begin{cases} \alpha_i \text{ at } x = \pm \frac{S}{2}(2i-1), i = 1.2, \ldots, N \\ 0 \text{ otherwise} \end{cases} \quad (4)$$

The transform for the total coupling distribution is $$F_{CD} = 2 \sum_{i=1}^{N} \alpha_i \cos\left[\frac{S}{2}(\beta_1 \mp \beta_2)\right] = 2 \sum_{i=1}^{N} \alpha_i \cos\left(\frac{2i-1}{2N-1} \pi \theta_{CD}\right). \quad (5)$$

Therefore, the coupling and the directivity can be defined as $$\begin{bmatrix} \text{Coupling} \\ \text{Directivity} \end{bmatrix} = \frac{F_{CD}}{F_{CD}(\theta = 0)} = \quad (6)$$

-continued $$\frac{\sum_{i=1}^{N} \alpha_i \cos\left(\frac{2i-1}{2N-1}\pi\theta_{CD}\right)}{\sum_{i=1}^{N} \alpha_i}$$

This mode coupler design method optimizes the number of coupling points to meet required coupling and directivity levels. For example, consider mode rejection (coupling or directivity) for uniform coupling with 8 equally spaced points ($N=4$ and $\alpha_i$=constant) which is plotted in FIG. 9. For the tracking mode coupler design developed, the region of interest for 8 coupling points is $0.9<\theta<6.1$. This design results in only 13-dB rejection of the unwanted mode. This result indicates that either the coupling distribution should be modified or the number of coupling holes should be increased or both to obtain a desired 40-dB rejection. To accomplish this rejection, the actual coupler design was derived from a modified distribution where 32-, 48-, or 64-point couplings were considered.

Tight Coupling Effects of Multiple Discrete Couplings

Figure 10:
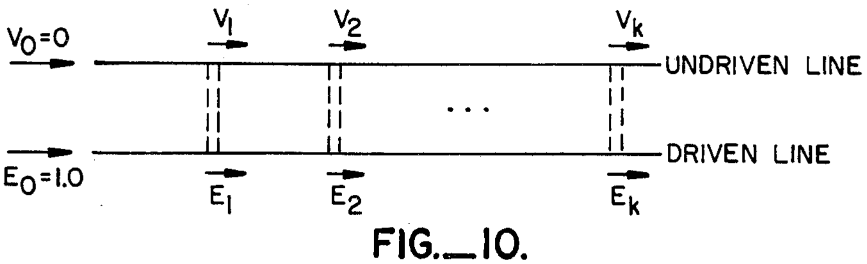
FIG. 10 is a diagram of a driven transmission line coupled to an undriven transmission line.

Assume that two transmission lines have identical propagation constants with coupling units located at intervals along the lines shown in FIG. 10. If $m_i$ couplings of magnitude $\alpha_i$ are located along the lines in any order, the wave amplitudes in the driven and undriven lines are $$E = \cos\left(\sum_{i=1}^{K} m_i \sin^{-1}\alpha_i\right), \text{ driven} \tag{7}$$

$$V = \sin\left(\sum_{i=1}^{K} m_i \sin^{-1}\alpha_i\right), \text{ undriven} \tag{8}$$

Our case is symmetric, equally spaced, and has an even number of points (2N). This means that $m_i=2$ and the summation extends over N. Let $$\alpha_i = a_i \alpha_o \tag{9}$$

where $\alpha_0$ is the coupling magnitude of the reference point and $a_i$ is the coupling distribution ratio with respect to the reference point. Then the coupling ratio V/E can be expressed as $$\frac{V}{E} = \tan\left[2 \sum_{i=1}^{N} \sin^{-1}(a_i \alpha_0)\right]. \tag{10}$$

Given $\alpha_0$, the coupling ratio V/E is determined, since the $a_i$ distribution is an input parameter describing the required coupling from loose coupling theory and the selected $\phi(X)$ distribution.

V/E measures coupling for the desired mode and shows a cyclical energy transfer between coupled waves $F_c$ is a loose coupling for mode rejection when the transferred power between the two lines is negligible, and is uniform for the desired mode assuming 100 percent coupling. Therefore, $F_c$ is used for the mode rejection and V/E is used for the desired mode coupling.

Ku-BAND $TE_{21}{}^C$-MODE COUPLER DESIGN

The design goal was to generate $TE_{21}{}^C$ from $TE_{10}{}^R$ with 0-dB coupling (if possible) and to suppress the unwanted propagating modes such as $TE_{11}{}^C$ and $TM_{11}{}^C$ by 40 dB across the 10.95-12.2-and 14.0-14.5-GHz frequency range. The superscripts C and R denote the circular and rectangular waveguides, respectively. To obtain 0-dB coupling between $TE_{21}{}^C$ and $TE_{10}{}^R$, the cutoff frequencies in both the driven line and coupled line should be the same in order to obtain the same phase constant in the waveguides. Let A be the interior broadwall dimension of a rectangular waveguide and D be the inside diameter of a circular waveguide. To maintain the same cutoff frequency in both the rectangular and circular waveguides, it is found that $$A = 0.51425D. \tag{11}$$

The cutoff frequency for the $TE_{21}{}^C$ mode was chosen to be approximately 10 percent below the primary operating band at 11.7 GHz. Since 1.083-in diameter pipe was available for fabrication of breadboard couplers, this pipe was used, and the $TE_{21}{}^C$ cutoff became 10.594 GHz. This cutoff also made it possible to have marginal performance at 10.95 GHz, which is only 3.4 percent above cutoff. Since coupling is a strong function of wall thickness and hole diameter, the actual waveguide wall thickness in the coupling region between the circular and the rectangular waveguides was chosen as 0.030 in.

TABLE 2

| VALUES OF $\tau$ FOR MODES OF INTEREST | | |
|---|---|---|
| 1 | 2 | $\tau$ |
| $TE_{21}^C$ | $TE_{11}^C$ | 0.36339 |
| $TE_{21}^C$ | $TE_{21}^C$ | 1.0 |
| $TM_{11}^C$ | $TE_{21}^C$ | 0.63517 |

Ku-Band Coupling Distribution

The phase constant in the waveguide can be expressed as $$\beta = 2\pi \frac{f}{C} \sqrt{1 - \left(\frac{f_C}{f}\right)^2}. \tag{12}$$

If we substitute (12) into (2), we obtain $$\theta_{CD} = L\frac{f}{C}\left[\sqrt{1 - \left(\frac{f_{C1}}{f}\right)^2} \mp \sqrt{1 - \tau\left(\frac{f_{C1}}{f}\right)^2}\right] \tag{13}$$

where $C$ = velocity of light $$\tau = \left(\frac{f_{C2}}{f_{C1}}\right)^2 \leq 1.$$

The subscripts 1 and 2 denote the two modes to be investigated. By using the values of $\tau$ tabulated in Table 2 and a coupling length of 14.0 in (13), the variation of $\theta_D^C$ with operating frequency is generated. These curves are shown in FIG. 11. Based on these curves and the amplitude distribution of the electric field the mode coupler can be designed.

One-Arm Coupler with Equal Holes

Figure 12:
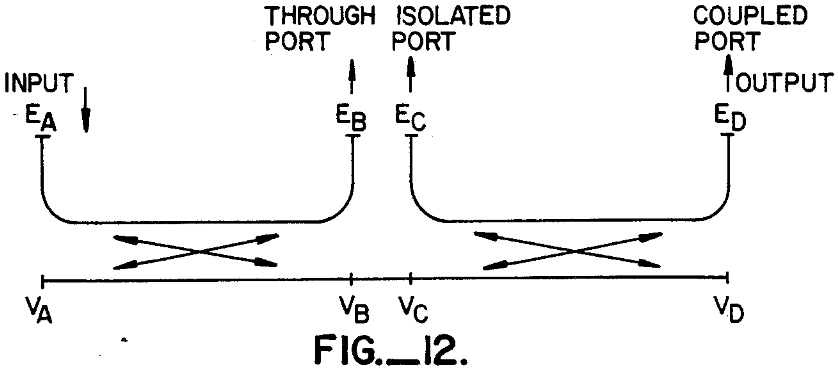
FIG. 12 is a schematic diagram illustrating two identical couplers connected in series.

A convenient method to determine $\alpha_0$ in (10) is from coupling measurements of a one-arm coupler with equal holes, since $\alpha_i$ is equal to 1 for all i for this case. Suppose two identical couplers are connected in series as shown in FIG. 12. Each coupler is symmetrical, equally spaced, and has equal coupling with 2N coupling points. Let $E_A$ and $E_D$ be the input and output, respectively, then the following equation is obtained:

$$\frac{E_D}{E_A} = \sin^2(2N\sin^{-1}\alpha_0). \tag{14}$$

The individual coupling per hole becomes $$\alpha_0 = \sin\left[\frac{1}{2N}\sin^{-1}\left(\sqrt{\frac{E_D}{E_A}}\right)\right] \tag{15}$$

where the total coupling ratio $E_D/E_A$ can be easily measured.

The individual hole coupling function $\alpha_0$ is directly related to the waveguide coupling structure which can be rectangular, circular, or elliptical in shape. Circular holes were chosen since the circle is a simple geometry described by only one dimension $D_0$ (hole diameter). It has been shown that coupling is approximately expressed as a function of $D_0^3$. From curve fitting of measured data, an empirical expression for coupling was obtained and is given by $$\alpha_0=(3.002f^2-74.328f+469.375)D_0^{3.6} \tag{16}$$

where f is the operating frequency in GHz.

Four-Arm Coupler with Bessel Distributions

Figure 13:
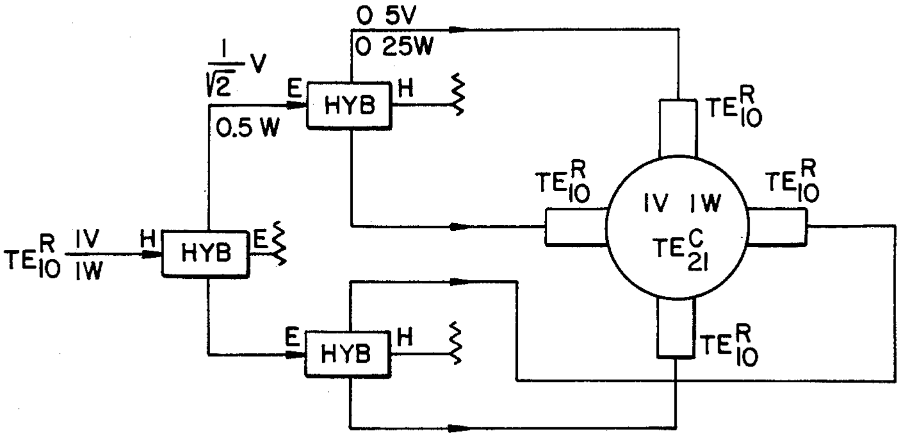
FIG. 13 is a schematic diagram of a four-arm coupler.

The four-arm coupler can be deduced from a one-arm coupler by including the comparator voltage division shown in FIG. 13. The four-ports should be transmission phase matched. The coupling ratio $V_B/E_A$ (see FIG. 12) for the four-arm coupler can be expressed as $$\frac{V_B}{E_A} = \sin\left[2\sum_{i=1}^{24}\sin^{-1}(2\alpha_i\alpha_0)\right] \tag{17}$$

by neglecting loss terms. Since $\alpha_i$ is a known distribution shown in FIG. 4, we obtain $\alpha_0=0.002083$ by solving (17) for 0-dB coupling. Since $\alpha_0$ is also expressed by (16), we obtain $D_0=0.0921$ in for 11.57 GHz. Let $d_i$ be the hole diameter ratio distribution corresponding to $\alpha_i$, then $d_i$ can be expressed as $$d_i=a_i^{1/3.6} \tag{18}$$

while the actual hole diameter $D_i$ is $$D_i=D_0d_i. \tag{19}$$

Successive coupling measurements were made using reference diameters ($D_0$) of 0.089, 0.0921, 0.098, 0.0995 and 0.1015. Minimum coupling loss for the 10.95–12.2-GHz frequency range was obtained for $D_0$= 0.098 in. The difference between the calculated optimum value of $D_0$(0.0921 in) and the measured value of $D_0$(0.098 in) is attributed to a change in sidearm phase constant caused by the perturbation that holes in the wall create. Therefore, measurement of the phase constant as a function of maximum hole diameter is necessary for accurate design. The best measured coupling of the $TE_{21}$-mode coupler described was −0.3 dB and is attributed due to dissipative loss of the coupler. Measured mode rejection between $TE_{11}^C$ and $TE_{21}^C$ modes is about 42-dB minimum from 10.95 to 14.5 GHz. Return loss of the $TE_{11}^C$ mode in the through waveguide is about −30-dB maximum (1.065;1 VSWR) from 10.95 to 20 GHz.

The invention has now been explained with reference to specific embodiments. Other embodiments will be apparent to those of ordinary skill in the art. It is therefore not intended that this invention be limited except as indicated by the appended claims.

We claim:

1. An apparatus for extracting tracking signals from a received microwave signal for directing an antenna, said apparatus operative to pass dominant mode information-containing microwave signals with minimum attenuation through a signal path of a first waveguide while extracting from said signal path selected favored nondominant mode microwave signals for use in developing error signals to control directional orientation of said antenna, said apparatus comprising a first waveguide, a second waveguide, a third waveguide, a fourth waveguide, a fifth waveguide, a sixth waveguide, a seventh waveguide, an eigth waveguide and a ninth waveguide, said first waveguide being circular and said second through ninth waveguides being rectangular, said second through ninth waveguides being disposed at angular separations of 45° juxtaposed to said first waveguide and oriented along a central axis of said first waveguide, said first waveguide forming a common wall with one wall of each said second through ninth waveguides, said common wall defining a coupling structure having the following characteristics between said first waveguide and each one of said second through ninth waveguides:

a row of holes whose centers are spaced equidistant along said central axis, each said hole being of a diameter no greater than 0.3 wavelengths of the wavelength of the highest frequency intended to be conveyed through said first waveguide in its characteristic dominant $TE_{11}$ mode, said holes being circular, said holes being of a diameter selected to produce a distribution of coupling strengths of a preselected nondominant mode of said first waveguide for coupling to each of said second through ninth waveguides, and specifically a nondominant $TE_{21}$ circular mode in said circular first waveguide which is manifest as a $TE_{10}$ rectangular mode in each one of said second through ninth waveguides, said distribution of coupling strengths being characterized by a Bessel function distribution of coupling strength along said central axis, said Bessel function distribution of coupling strength being established at a certain coupling strength level at each one of said holes to minimize reverse coupling from said second through ninth waveguides into said first waveguide by the size of said holes, said second through ninth waveguides having output ports being coupled in preselected pairs to extract from said first waveguide two balanced and orthogonal signals representative of energy contained in the $TE_{21}$ nondominant circular signal of said first waveguide for use in developing a tracking signal based on phase and amplitude information contained in the carrier of said $TE_{21}$ mode signal.

2. An apparatus for coupling a selected favored nondominant mode of electromagnetic energy from a first waveguide into a second waveguide, said first waveguide carrying dominant mode electromagnetic energy and nondominant mode electromagnetic energy, comprising:

a first waveguide;

a second waveguide juxtaposed to said first waveguide along a propagation length; and means for promoting coupling of electromagnetic energy from said first waveguide to said second waveguide, said coupling means comprising a common wall to said first waveguide and said second waveguide, said common wall having circular holes disposed along said propagation length, said circular holes having a diameter no greater than 0.3 wavelengths of the lowest order mode of the highest frequency of said dominant mode electromagnetic energy intended to traverse through said first waveguide, each said hole having a diameter selected as a function of an electric field ratio of a desired Bessel function distribution of said selected favored nondominant mode electromagnetic energy of said first waveguide along said propagation length, the Bessel function distribution being of the first kind of the zeroeth order, centers of said holes being equally spaced from one another, the smallest diameter holes being at opposing ends along said propagation length, the largest diameter holes being centered between said opposing ends of said propagation length and having therebetween holes which decrease in diameter from the largest diameter holes to the smallest diameter holes, for coupling said selected favored nondominant mode electromagnetic energy from said first waveguide to said second waveguide with maximum bandwidth and minimum phase distortion while maximizing propagation of said dominant mode microwave electromagnetic energy of said first waveguide with maximum bandwidth and minimum phase distortion through said first waveguide.

3. The apparatus according to claim 2 wherein said Bessel function distribution of the first kind of the zeroeth order is offset by a constant value sufficient to insure no less than zero positive energy coupling from said first waveguide to said second waveguide at a minimum point of energy coupling with respect to the propagation length of said selected favored nondominant mode to be coupled in order to inhibit coupling of energy to said first waveguide from said second waveguide.

4. The apparatus according to claim 2 wherein said first waveguide is a circular waveguide and said second waveguide is a rectangular waveguide, and wherein said selected favored nondominant mode of said first waveguide is a type $TE_{21}$ mode.

5. The apparatus according to claim 2 wherein said holes are aligned in straight length along said first waveguide, said common wall being circular in cross-section, and said second waveguide being rectangular in cross-section.

6. The apparatus according to claim 5 for use with a microwave signal comprising $TE_{11}$ and $TE_{21}$ field modes, said apparatus further comprising a third waveguide identical to said second waveguide and disposed along said first circular waveguide, and means for coupling said selected favored nondominant mode from said first waveguide to said third waveguide, said second waveguide and said third waveguide being disposed along a common wall with said first waveguide at a angular separation of 45° relative to a central axis of said first waveguide for separately receiving orthogonal, linearly polarized signals of said $TE_{21}$ field modes from said first waveguide.

* * * * *